United States Patent
He et al.

(10) Patent No.: US 9,014,708 B2
(45) Date of Patent: *Apr. 21, 2015

(54) NETWORK ENTITY FOR MOBILE COMMUNICATIONS TOWARDS A MOBILE STATION

(75) Inventors: Jennifer He, Shanghai (CN); Haibin Chu, Shanghai (CN); Richard Wang, Shanghai (CN); Marshall Xu, Shanghai (CN); Henry Zheng, Shanghai (CN)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 138 days.

This patent is subject to a terminal disclaimer.

(21) Appl. No.: 13/513,876

(22) PCT Filed: Dec. 11, 2009

(86) PCT No.: PCT/CN2009/001420
§ 371 (c)(1),
(2), (4) Date: Jun. 28, 2012

(87) PCT Pub. No.: WO2011/069278
PCT Pub. Date: Jun. 16, 2011

(65) Prior Publication Data
US 2012/0282937 A1    Nov. 8, 2012

(51) Int. Cl.
H04W 72/00    (2009.01)
H04W 8/26    (2009.01)
H04W 68/00    (2009.01)

(52) U.S. Cl.
CPC ............ *H04W 8/26* (2013.01); *H04W 68/00* (2013.01)

(58) Field of Classification Search
USPC ............... 455/450, 422.1, 432.1, 432.2, 433, 455/435.1, 458, 560
See application file for complete search history.

(56) References Cited

U.S. PATENT DOCUMENTS 6,097,951 A    8/2000    Ernam et al.
6,292,667 B1 *    9/2001    Wallentin et al. ............ 455/458

(Continued)

FOREIGN PATENT DOCUMENTS

CN    101127999 A    2/2008
CN    101242569 A    8/2008

(Continued)

OTHER PUBLICATIONS

3RD Generation Partnership Project, 3rd Generation Partnership Project; Technical Specification Group Services and System Aspects; Intra-domain connection of Radio Access Network (RAN) nodes to multiple Core Network (CN) nodes (Release 8), Technical Specification, 3GPP TS 23.236 V8.0.0, Dec. 1, 2008, pp. 1-38, 3GPP, France.

(Continued)

*Primary Examiner* — Brandon Miller
(74) *Attorney, Agent, or Firm* — Coats & Bennett, PLLC

(57) ABSTRACT

The present invention relates to a network entity for handling communications towards a mobile station over a communication network, the mobile station being capable of receiving a paging request from a mobile switching center of a pool of mobile switching centers, and, in response to the paging request, of transmitting a paging response over the communication network. The network entity comprises a receiver (101) for receiving the paging response, the paging response comprising mobile identity information identifying the mobile station, a processor (103) for identifying the mobile switching center to which to re-transmit the paging response upon the basis of the mobile identity information, and a transmitter (105) for retransmitting the paging response to the identified mobile switching center.

16 Claims, 9 Drawing Sheets

(56) References Cited

U.S. PATENT DOCUMENTS

| | | | |
|---|---|---|---|
| 6,771,983 B1 * | 8/2004 | Turina et al. | 455/560 |
| 7,164,926 B2 | 1/2007 | Papadimitriou et al. | |
| 7,668,558 B2 | 2/2010 | Gallagher et al. | |
| 7,995,564 B1 * | 8/2011 | Boudreaux et al. | 370/352 |
| 8,160,582 B2 | 4/2012 | Han et al. | |
| 8,675,640 B2 | 3/2014 | Liu et al. | |
| 8,706,122 B2 * | 4/2014 | Vikberg et al. | 455/445 |
| 2003/0223383 A1 | 12/2003 | Chang et al. | |
| 2004/0203736 A1 | 10/2004 | Serna | |
| 2006/0089146 A1 | 4/2006 | Gazzard | |
| 2009/0061877 A1 * | 3/2009 | Gallagher et al. | 455/436 |
| 2010/0035609 A1 | 2/2010 | Hui | |
| 2010/0097974 A1 | 4/2010 | Ye et al. | |
| 2013/0210466 A1 | 8/2013 | Arvidsson et al. | |
| 2013/0316704 A1 | 11/2013 | Horne | |

FOREIGN PATENT DOCUMENTS

| | | | | |
|---|---|---|---|---|
| CN | 101394587 A | 3/2009 | | |
| CN | 101400038 A | 4/2009 | | |
| EP | 1928192 A1 * | 6/2008 | | H04Q 7/34 |
| EP | 1991015 A1 * | 11/2008 | | H04Q 7/38 |
| WO | 0024216 A2 | 4/2000 | | |
| WO | 2008154882 A1 | 12/2008 | | |

OTHER PUBLICATIONS

3RD Generation Partnership Project, "3rd Generation Partnership Project; Technical Specification Group Core Network and Terminals; Mobile radio interface Layer 3 specification; Core network protocols; Stage 3 (Release 9)", Technical Specification, 3GPP TS 24.008 V9.0.0, Sep. 1, 2009, pp. 1-591, 3GPP, France.

3RD Generation Partnership Project, "3rd Generation Partnership Project; Technical Specification Group Radio Access Network; UTRAN Iu interface Radio Access Network Application Part (RANAP) signalling (Release 9)", Technical Specification, 3GPP TS 25.413 V9.0.0, Sep. 1, 2009, pp. 1-400, 3GPP, France.

3RD Generation Partnership Project, "3rd Generation Partnership Project; Technical Specification Group GSM/EDGE Radio Access Network; Mobile radio interface layer 3 specification; Radio Resource Control (RRC) protocol (Release 9)", Technical Specification, 3GPP TS 44.018 V9.2.0, Sep. 1, 2009, pp. 1-425, 3GPP, France.

3RD Generation Partnership Project, "3rd Generation Partnership Project; Technical Specification Group Services and System Aspects; Network Sharing; Architecture and functional description (Release 9)", Technical Specification, 3GPP TS 23.251 V9.0.0, Sep. 1, 2009-09-01, pp. 1-19, 3GPP, France.

3RD Generation Partnership Project, "3rd Generation Partnership Project; Technical Specification Group Radio Access Network; Radio Resource Control (RRC); Protocol Specification (Release 9)", Technical Specification, 3GPP TS 25.331 V9.0.0, Sep. 1, 2009, pp. 1-1710, 3GPP, France.

3RD Generation Partnership Project, "3rd Generation Partnership Project; Technical Specification Group Services and System Aspects; Intra-domain connection of Radio Access Network (RAN) nodes to multiple Core Network (CN) nodes (Release 8)", 3GPP TS 23.236 V8.1.0, Dec. 1, 2009, pp. 1-39, 3GPP, France.

* cited by examiner

NETWORK ENTITY FOR MOBILE COMMUNICATIONS TOWARDS A MOBILE STATION

TECHNICAL FIELD

The present invention relates to the field of mobile communications.

BACKGROUND

The increasing demand for wireless telecommunication services has resulted in the growth of many wireless telecommunication systems and increase in the number of roaming wireless subscribers. With the third generation (3G) systems, efforts have been implemented to accommodate and distribute the increased traffic load in the network among a number of mobile switching centers being arranged to form a mobile switching center pool (MSC pool) for handling communications such as mobile terminated calls (MTC) towards a mobile station or mobile originated calls (MOC) from the mobile station. Usually, the MSCs form an interface towards a core network (CN), wherein the communications towards the mobile station are handled via a radio access network which may comprise a Node B and a Radio Network Controller (RNC).

By way of example, in order to set up a MTC, a MSC in which the mobile station is registered is determined by a Home Location Register (HLR). The MSC initiates a paging request towards the mobile station, which, in response thereto, sends a paging response towards the MSC to proceed further with the MTC. However, if the MSC in which the mobile station is registered is out of service then the RNC may route the returned paging response to any MSC in MSC pool. However, the attempt to establish the MTC may fail if the paging response is transmitted to a MSC which has not been involved in establishing the MTC.

Accordingly, there exists a need for efficiently managing mobile terminated calls in particular if one of the MSCs in the MSC pool is out of service.

SUMMARY

The present invention is based on the finding that mobile terminated calls may efficiently be handled if the network entity which received a paging response originating from a mobile station re-transmits the paging response to the mobile switching center which initiated the paging request triggering the paging response.

According to an aspect, the invention relates to a network entity for handling communications towards a mobile station over a communication network, wherein the mobile station may be capable of receiving a paging request from a mobile switching center of a pool of mobile switching centers, and, in response to the paging request, of transmitting a paging response over the communication network. The network entity comprises a receiver for receiving the paging response, the paging response comprising mobile identity information identifying the mobile station, a processor for identifying the mobile switching center to which to re-transmit, in particular to forward, the paging response upon the basis of the mobile identity information, and a transmitter for re-transmitting the paging response to the identified mobile switching center.

According to an embodiment, the network entity may be a network proxy entity for arranging communications of the pool of mobile switching centers. By way of example, the network proxy entity may manage communications of the pool of mobile switching centers towards and from e.g. a radio network controller. Preferably, the receiver may be configured to receive a paging request from the mobile switching center, wherein the transmitter may be configured to re-transmit the paging request to e.g. the radio network controller or to the base station controller, for forwarding the paging request to the mobile station.

According to an embodiment, the network entity may be a radio network controller or a base station controller for e.g. directly communicating with the mobile station via e.g. the communication network. Thus, the network entity may be configured to manage communications of the mobile station towards and from the pool of mobile switching centers. In addition, the receiver may be configured to receive the paging request from the mobile switching center or from the pool of mobile switching centers, and the transmitter may be configured to forward the paging request to the mobile station.

According to an embodiment, the processor may be configured to identify the mobile switching center to which to re-transmit, e.g. to forward, the paging response upon the basis of the mobile identity information received together with the paging response, upon the basis of a pre-stored mobile identity information e.g. identifying the mobile station, and upon the basis of a global identity information identifying the mobile switching center which initiated the paging request. The global identity information may be associated with the pre-stored mobile identity information. By way of example, the pre-stored mobile identity information and the global identity information are linked with each other and stored e.g. in a memory so that the global identity information may be retrieved upon the basis of the pre-stored mobile identity information. Thus, a comparison of the mobile identity information received together with the paging response with the pre-stored mobile identity information received e.g. together with the paging request enables to directly identify the mobile switching center which initiated the paging request to the mobile station.

According to an embodiment, the processor may be configured to map, e.g. to compare the mobile identity information received with the paging response with a pre-stored mobile identity information, e.g. with the above mentioned pre-stored mobile identity information, which is associated with a global identity information identifying the mobile switching center in order to determine the global identity information for identifying the mobile switching center in order to determine the global identity information.

According to an embodiment, the processor may be configured to identify the mobile switching center upon the basis of a look-up table comprising a network resource identification value indicating a first mobile switching center and a second mobile switching center, wherein the second mobile switching center replaces the first mobile switching center as its stand-by if the first mobile switching device is out of service. In other words, the network resource identification value is associated to two mobile switching centers, a primary one and a secondary one. Nevertheless, each MSC may be assigned to its own NRI value e.g. for TMSI allocation, wherein all NRI values may be partitioned between the MSCs in the MSC pool.

The look-up table may be stored in a memory having memory entries which are formed by the network resource identification values. Thus, in order to re-transmit the paging response, the network entity may refer to the look-up table in order to determine the second mobile switching center to which to re-transmit the paging response if the first mobile switching center is out of service.

According to an embodiment, the processor may be configured to derive global identity information from the paging request, in particular form the mobile identity information, the global identity information indicating the mobile switching center which initiated the paging request, the mobile switching center being associated with a network resource identification value. Preferably, the processor may be further configured to associate a further mobile switching center with the network resource identification value. Thus, different mobile switching centers may be associated with the same network resource identification value.

According to an embodiment, the mobile identity information may comprise or correspond to an international mobile subscriber identity (IMSI) or a temporary mobile subscriber identity (TMSI).

According to an embodiment, the processor is configured to identify the mobile switching center to which to re-transmit the paging response if the mobile station is registered in a mobile switching center which is out of service. If the mobile switching center in which the mobile station is registered is not out of service, then the standard approach according to e.g. the TS 23.236 standard may be deployed.

According to an embodiment, the processor may be configured to derive an Intra-Domain Non-Access Stratum Node Selector (IDNNS) parameter from the paging response in order to determine whether the IDNNS parameter indicates that the mobile station is registered in a mobile switching center which is out of service.

According to an embodiment, the network entity may be arranged to support communications according to the universal mobile telecommunication system (UMTS) and/or to the global system for mobile communications (GSM) and/or to the long term evolution (LTE) technology and/or to the code division multiple access 2000 (CDMA2000) technology.

According to an aspect, the invention relates to a method for handling communications towards a mobile station over a communication network, the mobile station being capable of receiving a paging request from a mobile switching center of a pool of mobile switching centers, and, in response to the paging request, for transmitting a paging response over the communication network. Preferably, the method comprises receiving the paging response comprising mobile identity information identifying the mobile station, identifying the mobile switching center to which to re-transmit the paging response upon the basis of the mobile identity information, and re-transmitting the paging response to the identified mobile switching center.

Further method steps are directly derivable from the functionality of the network entity.

According to an aspect, the invention relates to a computer program for executing the method for handling communications towards a mobile station when run on a computer.

According to an aspect, the invention relates to a programmably arranged network entity being configured to execute the computer program for executing the method for handling communications towards a mobile station.

According to an aspect, the invention relates to a network entity for handling communications towards and/or from a pool of mobile switching centers. The network entity comprises a processor for assigning a first mobile switching center and a second mobile switching center to the same network resource identification (NRI) value in order to configure the second mobile switching center to form a stand-by for the first mobile switching center e.g. if the first mobile switching device is out of service. Hence, the second mobile switching center is assigned to replace the first mobile switching center if the first mobile switching center is out of service.

According to an embodiment, the processor may be configured to assign first global identity information of the first mobile switching center and second global identity information of the second mobile switching center to the same NRI value. The respective global identity information may be derived from e.g. a paging request initiated by the respective mobile switching center.

According to an embodiment, the processor may be configured to associate the NRI with identifiers of the first and the second mobile switching center, e.g. a global identity information of the first and second mobile switching center or a respective network alias name.

According to an embodiment, the processor may be configured to derive global identity information of the second mobile switching center from the paging request, in particular from the mobile identity information such as IMSI or TMSI, wherein the global identity information indicates the first or second mobile switching center which initiated the paging request. The global identity information may be associated with the NRI in a look-up table.

According to an embodiment, the network entity may comprise a transmitter for transmitting an indication message e.g. towards a HLR or the towards the second mobile center or towards a network proxy managing the pool of mobile switching centers to indicate that the second mobile switching center is assigned to replace the first mobile switching center if the first mobile switching device is out of service.

According to an embodiment, the network entity is a network proxy or a RNC.

According to an aspect, the invention relates to a method for handling communications towards and/or from a pool of mobile switching centers. The method comprises assigning a first mobile switching center and a second mobile switching center to the same network resource identification value to configure the second mobile switching center to form a stand-by for the first mobile switching center if the first mobile switching device is out of service. Hence, the second mobile switching center is assigned to replace the first mobile switching center if the first mobile switching center is out of service.

Further method steps are directly derivable from the functionality of the network entity.

According to an aspect, the invention relates to a computer program for executing the method for handling communication communications towards and/or from a pool of mobile switching centers when run on a computer.

According to an aspect, the invention relates to a programmably arranged network entity being configured to execute the computer program for executing the method for handling communications towards and/or from a pool of mobile switching centers.

BRIEF DESCRIPTION OF THE DRAWINGS

Further embodiments of the invention will be described with reference to the following figures, in which.

DETAILED DESCRIPTION

Before embodiments of the invention are described in detail, it is to be understood that this invention is not limited to the particular component parts of the devices described or steps of the methods described as such devices and methods may vary. It is also to be understood that the terminology used herein is for purposes of describing particular embodiments only, and is not intended to be limiting. It must be noted that, as used in the specification and the appended claims, the singular forms "a," "an" and "the" include singular and/or plural referents unless the context clearly dictates otherwise.

Figure 1:
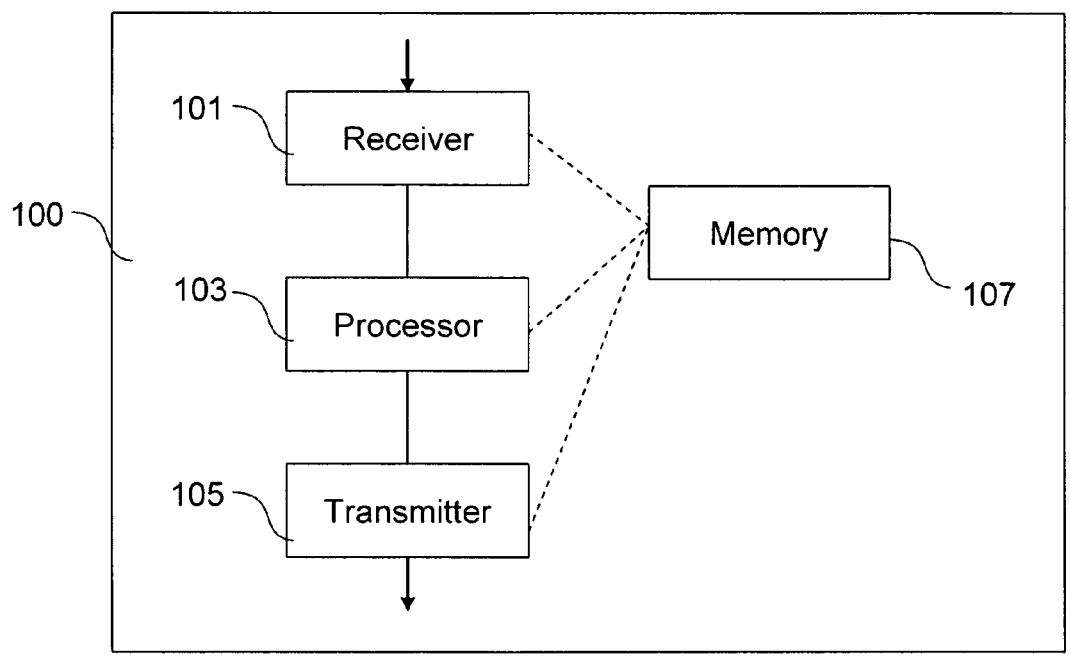
FIG. 1 shows a block diagram of an embodiment of a network entity.

FIG. 1 shows a network entity comprising a receiver 101 for receiving a paging response comprising mobile identity information identifying a mobile station which transmitted the paging response in response to a paging request initiated by a mobile switching center.

By way of example, the mobile station may be registered in a mobile switching center which is out of service. In order to identify the mobile switching center forming a stand-by solution, i.e. the mobile switching center replacing the one out of service, the network entity may comprise a processor 103 for identifying such a mobile switching center in order to re-transmit the paging response to that identified mobile switching center. The processor may identify the mobile switching center upon the basis of the mobile identity information, e.g. IMSI or TMSI. The network entity may further comprise a transmitter 105 for re-transmitting the paging response to the identified mobile switching center.

Optionally, the network entity may comprise memory 107 for storing a network resource identification value which may be assigned to a first mobile switching center and to a second mobile switching center replacing the first mobile switching center if the first mobile switching device is out of service. The memory 107 may e.g. store the corresponding entries in a look-up table.

The network entity shown in FIG. 1 may be a network proxy entity or a RNC or a BSC. Moreover, the network entity may be arranged to configure a mobile switching center to form a stand-by for another mobile switching center as described further on.

According to some implementations, the processor (103) may be configured for assigning a first mobile switching center and a second mobile switching center to the same network resource identification (NRI) value in order to configure the second mobile switching center to form a stand-by for the first mobile switching center if the first mobile switching device is out of service. Thus, the second mobile switching center is assigned to replace the first mobile switching center if the first mobile switching center is out of service upon the basis of the network identification value.

Figure 2:
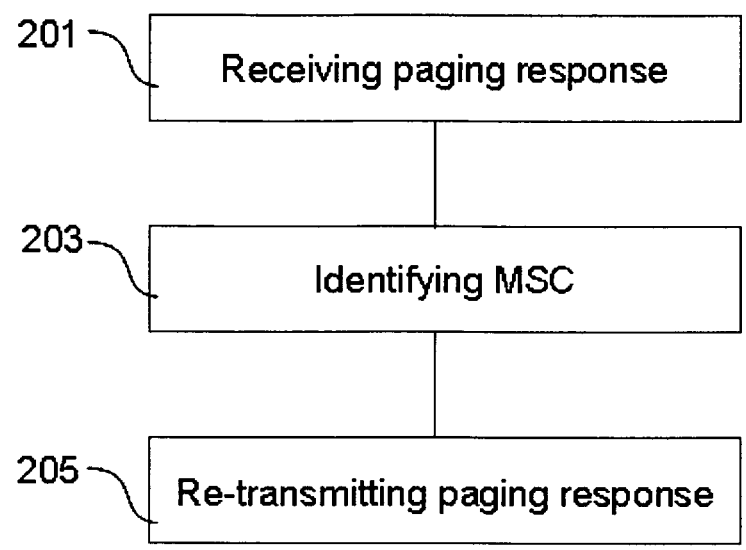
FIG. 2 shows a flow diagram of method steps performed by a network entity for handling communications towards a mobile station.

FIG. 2 shows a block diagram of a corresponding method for handling communications comprising receiving 201 the paging response along with the mobile identity information, identifying 203 the mobile switching center to which to re-transmit the paging response upon the basis of the mobile identity information, and re-transmitting 205 the paging response to the identified mobile switching center.

Figure 3:
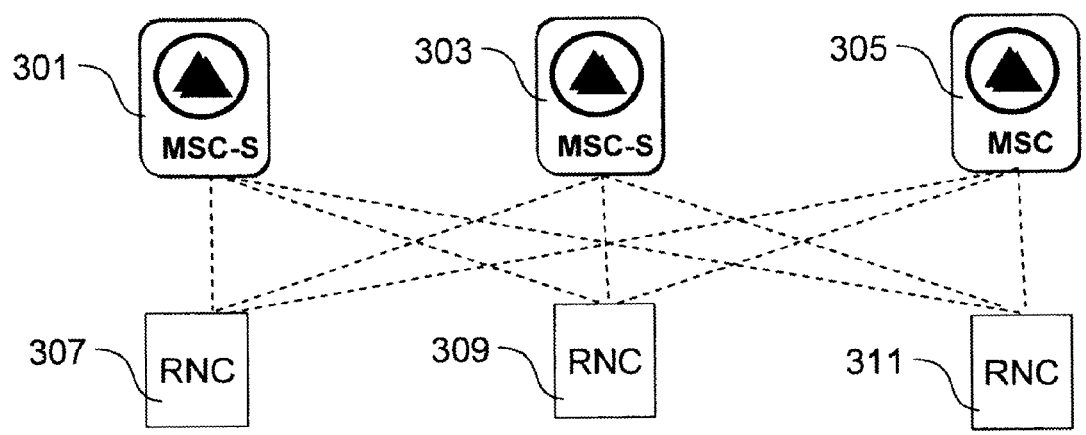
FIG. 3 shows an exemplary arrangement of mobile switching centers in pool.

FIG. 3 shows a pool of interconnected mobile switching centers 301, 303 and 305 being arranged to communicate with mobile stations not depicted in FIG. 3 via base station systems comprising the RNCs 307, 309 and 311. It shall be noted that the RNCs 307, 309, 311 may, according to some implementations, be replaced by BSCs. The base station systems may wirelessly communicate with the mobile stations located in the cells of the radio access network. As depicted in FIG. 3, the RNCs 307 to 311 are interconnected with the mobile switching centers (MSC) 301 to 305 which may provide a connection mechanism to fixed networks which may include the Public-Switched Telephone Network (PSTN) or an Integrated Service Digital Network (ISDN), by way of example. Furthermore, the MSCs 301 to 305 may comprise or communicate with a Visitor Location Register (VLR) and/or a Home Location Register (HLR) which are not depicted in FIG. 3 in order to provide call routing and roaming capabilities for the respective communication network. By way of example, the HLR may store administrative information of the subscribers along with the current location of the respective mobile station such a Personal Digital Assistant (PDA) or a Personal Communications Service (PCS) device or a cellular phone or a computer.

According to some implementations, a respective RNC node 307 to 311 may be connected to only one MSC 301 to 305. However, the arrangement of the MSCs 301 to 305 in pool allows each RNC 307 to 311, which respectively form a Radio Access Network (RAN) node, to be simultaneously connected to multiple core network (CN) nodes, i.e. to the MSC 301 to 305. Thus, each MSC 301 to 305 may serve communications, i.e. traffic, from and to any RNC 307 to 311.

Figure 4:
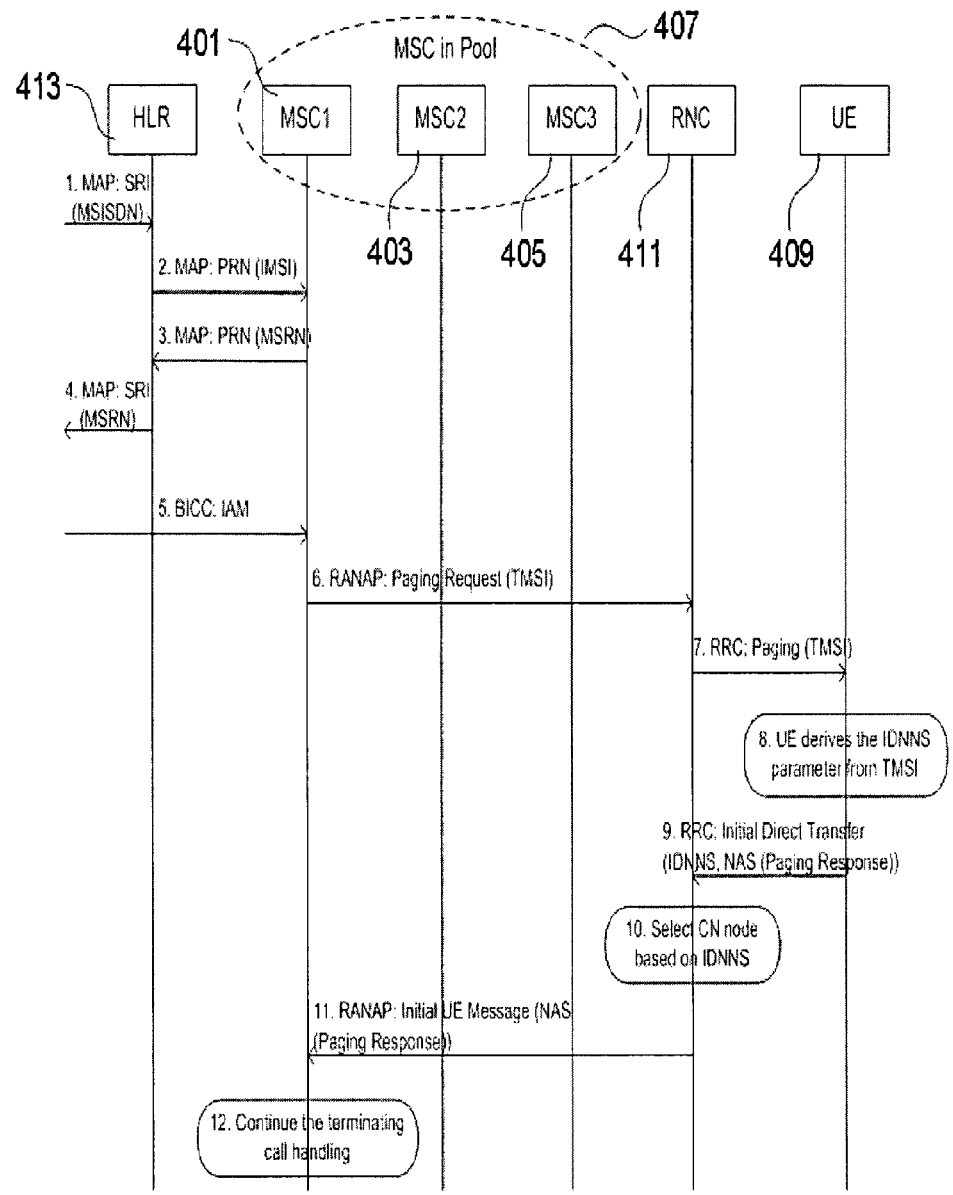
FIG. 4 shows a sequence diagram depicting exemplary messages in a mobile call termination.

FIG. 4 shows a Mobile Terminating (MT) call scenario for MSC in Pool (MiP) in a WCDMA or TD-SCDMA or UMTS MiP network (WCDMA: Wideband Code Division Multiple Access; TD-SCDMA: TD-SCDMA: Time Division-Synchronized Code Division Multiple Access). By way of example, three MSCs 401, 403 and 405 are arranged in a MSC pool 407 for handling communications towards a mobile station 409, e.g. towards user equipment (UE), communicating with a RNC 411. Furthermore, a HLR 413 is provided.

By way of example, the mobile station 409 may be registered in the first MSC 401. When terminating a call to the mobile station 409, the HLR 413 may receive a MAP message comprising Send Routing Information (SRI) from a core network, step 1. In response thereto, the HLR 413 may send a MAP message Provide Roaming Number (PRN) to the first MSC 401, which message may comprise the IMSI of the mobile station 409, step 2. In response thereto, the first MSC 401 may allocate the Mobile Station Roaming Number (MSRN) for the concerned subscriber, i.e. for the mobile station 409, and return the PRN message to the HLR 413, step 3, which, in turn, returns the SRI message to the core network, step 4. In response thereto, a BICC (Bearer Independent Call Control) initiated IAM (Initial Address Message) is provided to the first MSC 401, step 5, which, in response thereto, pages the mobile station 409 by sending a RANAP (Radio Access Network Application Part) message comprising a paging request with a TMSI, by way of example, step 6. Upon receiving the paging request, the RNC 411 transmits a RRC (Radio Resource Control) paging message with the TMSI to the mobile station 409, step 7. After receiving the paging request, the mobile station 409 may derive the intra-domain None Access Stratum (NAS) node selector (IDNNS) parameter from its TMSI, step 8, return the RRC message Initial Direct Transfer (IDT) including the IDNNS parameter and encapsulating the NAS message paging response to the RNC 411, step 9. In response thereto, the RNC 411 may select the core network node, e.g. the first MSC 401, step 10, based on the received IDNNS parameter, wherein the RANAP initial UE message encapsulating the NAS message paging response is transmitted to the first MSC 401, step 11.

Figure 5:
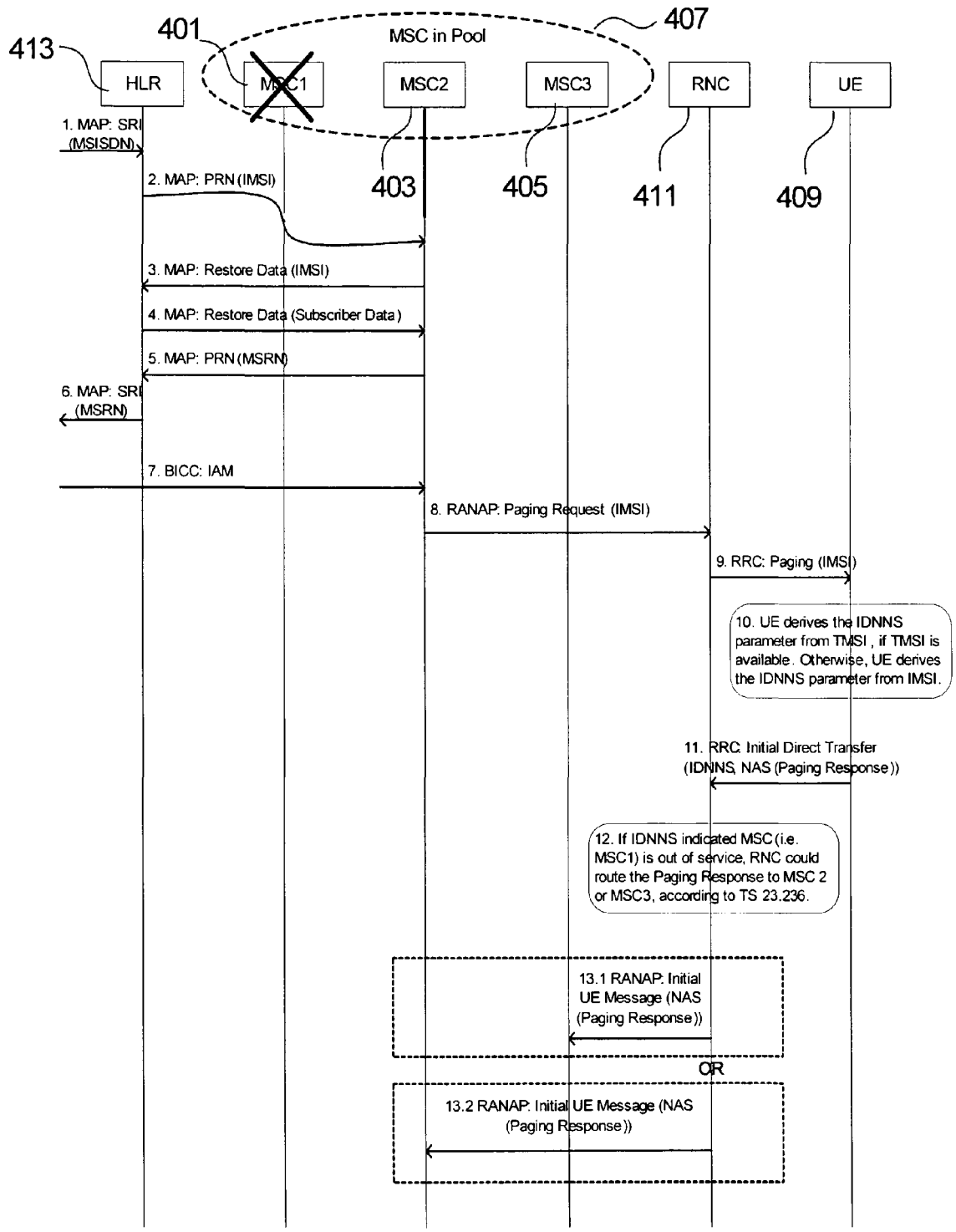
FIG. 5 shows a sequence diagram depicting exemplary messages in a mobile call termination.

However, it is possible that one of the MSCs 401 to 405 in the MSC pool 407 is out of service, wherein also global paging may not be supported. In this case, the mobile station 409 may be registered in a further MSC pool member or proceed upon the basis of a periodic location update. Such scenario is depicted in FIG. 5, where, by way of example, the first MSC 401 is out of service. In difference to the scheme shown in FIG. 4, the PRN message with the IMSI may alternatively be routed to the second MSC 403 representing a stand-by MSC for the first MSC 401. The stand-by MSC is the MSC which handles the mobile terminated traffic for the failed MSC in the MSC pool 407. Therefore, the subscriber data concerning the mobile station 409 and including the IMSI and the location area identifier have already been replicated to the second MSC 403 by the first MSC 401.

In reference to FIG. 5, the HLR 413 sends the MAP message Provide Roaming Number (PRN) to the first MSC 401, step 1, which is, by way of example, out of service. Due to an alternative routing configuration, the PRN message is rerouted to the second MSC 403 which is a stand by for the first MSC 401, step 2, wherein the second MSC 403 sends the MAP message Restore Data to the HLR 413, step 3, which thereafter returns the MAP message Restore Data with the subscriber data concerning the mobile station 409, step 4. Thereafter, the second MSC 403 allocates the Mobile Station Roaming Number (MSRN) for the mobile station 409 and returns the PRN message to the HLR 413, step 5, which returns the SRI message, step 6. Thereafter, the second MSC 403 receives the IAM message, step 7, and pages the mobile station 409 by sending the RANAP message Paging Request with the IMSI of the mobile station 409, step 8. Then, the RNC 411 sends the RRC Paging message with the IMSI to the mobile station 409, step 9. After receiving the paging request, the mobile station 409 derives the Intra-Domain NAS Node Selector (IDNNS) parameter from its TMSI, if TMSI is available, step 10. Otherwise, the mobile station 409 derives the IDNNS parameter from its IMSI. Thereafter, the mobile station 409 returns the RRC message Initial Direct Transfer, which includes IDNNS parameter and encapsulates the NAS message Paging Response, step 11. Then, the RNC 411 tries to select the CN node, i.e. a MSC, based on the received IDNNS parameter, step 12.

Thereafter, the following approaches may be implemented:

If the IDNNS is derived from the TMSI in e.g. a UMTS network scenario, and the first MSC 401 selected based on the IDNNS is not available, then, according to the TS 23.236 standard, the RNC 411 may select any one of the available MSCs 403, 405 in the MiP 407. In particular, the RNC 411 may select the CN node, e.g. the third MSC 405, which did not initiate the paging request.

Alternatively, if the IDNNS is derived from IMSI and the global CN ID identifying the paging MSC in the paging request is not stored by the RNC 411, then the CN node selected based on the IDNNS, e.g. the first MSC 401, may not be available. In this case, according to the TS 23.236 standard, the RNC 411 may select one of the further available MSCs 403, 405 in the MiP 407. In particular, the RNC 411 may also select a CN node which did not initiate the paging request, e.g. the third MSC 405.

If, however, the TMSI is not available then the IDNNS may also be derived from the IMSI, and if the RNC 411 stores the global CN ID, then the CN node selection may be based on the stored global CN ID and the appropriate MSC, i.e. the second MSC 403, may be selected as the CN node.

According to the selection result, the RNC 411 may transmit the RANAP Initial UE message, which encapsulates the NAS message Paging Response, step 13.1 or step 13.2 respectively. As mentioned above, the RANAP message may be transmitted to the second MSC 403 or even to the third MSC 405. If the paging response reaches the third MSC 405, then the third MSC 405 may determine which MSC in pool paged the mobile station and re-transmit the paging response to the relevant MSC for further proceeding. Thus, the third MSC 405 does not immediately discard the paging response which reduces the paging response failure rate and terminating call failures. Furthermore, unnecessary repetitions of the paging request by the second MSC 403 are avoided, so the air interface resources may more efficiently be used.

If the MSC which did not initiate the paging request receives a paging response with IMSI then it may transmit multicast packets within the MSC pool to inquiry the IMSI paging initiator. According to some implementations, only the MSC initiating the paging request may answer the multicast inquiry so that unnecessary communications may be avoided. Upon reception of the reply for the multicast inquiry, the MSC receiving the original paging response may forward or relay the paging response towards the paging initiator MSC.

According to some implementations, a pair of multicast messages for paging initiator inquiry may be implemented for the MSCs in the pool area. Further, the MSCs may be configured to buffer the paging response when waiting for paging initiator reply and to forward the paging response upon receiving the multicast reply, i.e. the aforementioned acknowledgement message.

According to some implementations, when a MSC in pool which did not initiate the paging request receives a paging response along with the IMSI, and if this MSC does not have a corresponding IMSI record e.g. in its VLR then the MSC may transmit a multicast packet containing the IMSI to the other MSCs in the pool to inquire the IMSI paging initiator. The MSC may also start a timer to wait for the inquiry reply which may be formed by an acknowledgement message indicating the paging initiator.

For example, only the MSC initiating the paging request may answer to the multicast inquiry, wherein the other MSCs which did not initiate the paging request do not respond, i.e. remain silent. Upon reception of the reply for the multicast inquiry being formed by e.g. the acknowledgement message, the MSC receiving the original paging response may stop the counter, e.g. an inquiry waiting timer, and forward the buffered paging response towards the MSC which is the paging initiator. After successfully forwarding the paging response, the buffered paging message may be removed from the memory. In addition, if the inquiry waiting timer reaches a timer value associated with a predetermined waiting interval then the MSC may remove the buffered paging response message from the memory.

Figure 6:
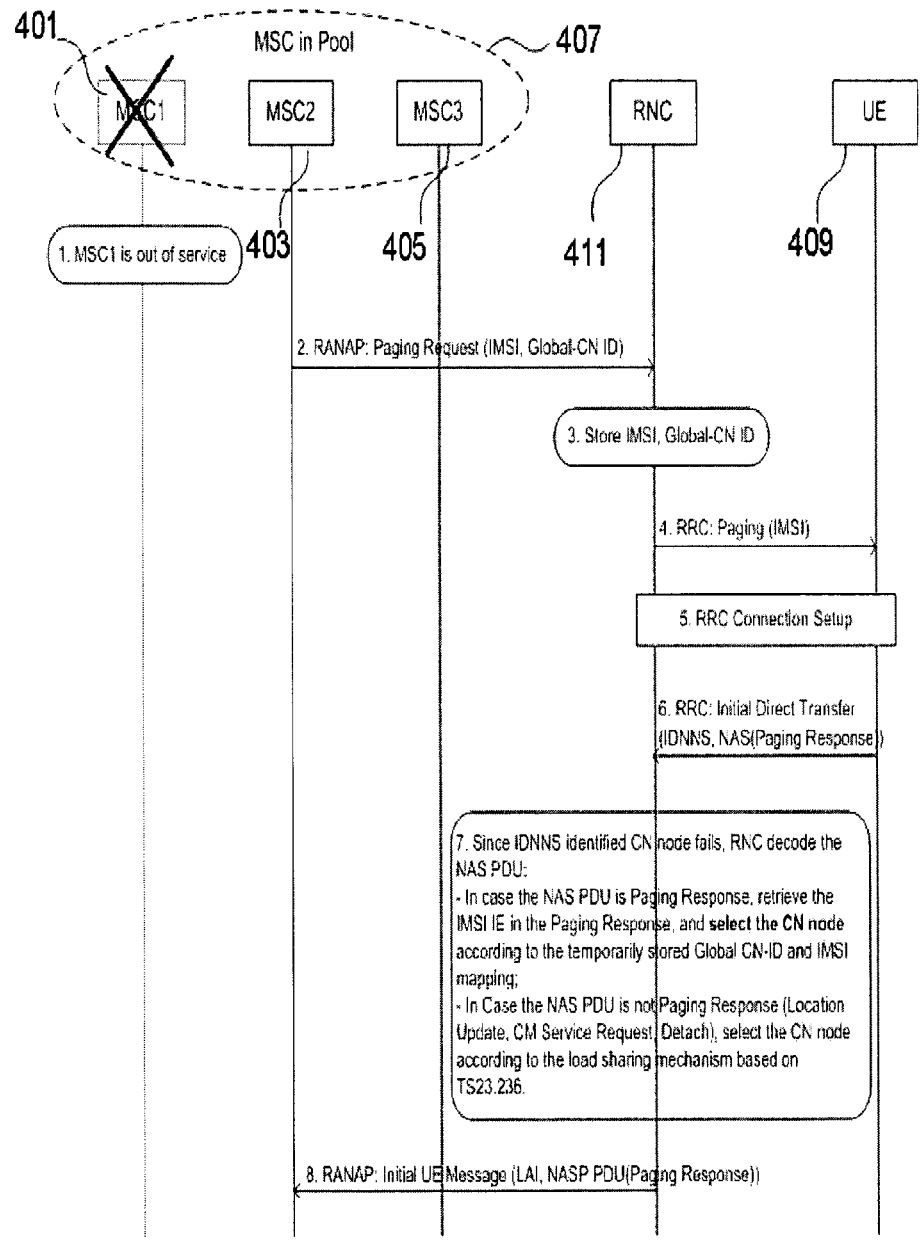
FIG. 6 shows a sequence diagram depicting exemplary messages in a mobile call termination.

FIG. 6 shows a mobile terminated call scenario according to which e.g. the RNC 411 identifies the MSC to which to re-transmit the paging request if the mobile station is registered in a MSC, e.g. the first MSC 401, which is out of service. Upon identifying the MSC, the paging response may dedicatedly be transmitted to e.g. the second MSC 403 forming a stand-by for the first MSC 401. The scheme of FIG. 6 may incorporate an enhanced NAS Node Selection Function (ENNSF) which may be RNC-based e.g. to support IMSI-based paging.

By way of example, the RNC 411 forming an embodiment of a network entity may store global identity information, e.g. the global CN ID, and the IDDNS derived from the IMSI in the paging request when receiving IMSI-based paging from the second MSC 403. Further, the RNC 411 may decode the NAS PDU Information Element (IE) in the Initial Direct Transfer message if the IDNNS identified CN node, e.g. the first MSC 401, fails. If the NAS PDU represents a paging response, then the RNC 411 may retrieve the IMSI IE in the paging response, and select the CN node being represented by a MSC according to the temporarily stored global CN ID and IMSI mapping. However, if the NAS PDU does not concern a paging response but represents e.g. a location update, a CM service request, or a detach, then the RNC 411 may select the CN node, i.e. one of the MSCs in pool 407 based on load sharing mechanism according to the TS 23.236 standard.

By way of example, the RNC 411 may temporarily store the global CN ID and the IDDNS derived from the IMSI when receiving the paging request without the TMSI. Hence, the RNC 411 may decode the NAS PDU IE in the Initial Direct Transfer message if the IDNNS identified CN node, i.e. MSC, fails. If the NAS PDU is paging response, then the IMSI IE in the paging response may be retrieved, and the CN node according to the temporarily stored CN ID and IMSI mapping may be selected. However, if the NAS PDU is not a paging response but e.g. a location update, a CM service request or a detach then the RNC 411 may select the CN node, i.e. the MSC, based on the load sharing mechanism according to the TS 23.236 standard.

With reference to FIG. 6, the call flow for e.g. IMSI-based paging with RNC based ENNSF may be as follows:

If a MSC/VLR, e.g. the first MSC 401, is out of service in the MSC pool 407, step 1, then the stand-by MSC/VLR, e.g. the second MSC 403 may, in step 2, initiate IMSI-based paging when a mobile terminated call is directed towards the mobile station 409 registered in the failed MSC/VLR 401. If the RANAP paging message is received without the TMSI then the RNC 411 may, in step 3, e.g. temporarily store the IDDNS derived from the IMSI together with the global CN ID. In step 4, the RNC 411 may initiate paging with the IMSI of the mobile station 409. In response thereto, the mobile station 409 may, in step 5, set up a RRC connection with the RNC 411. In step 6, the mobile station 409 may send the Initial Direct Transfer message towards the RNC 411, wherein the mobile station 409 may set the IE "Intra Domain NAS Node Selector" (IDNNS) as follows:

derive the IDNNS from the TMSI, if a valid TMSI is available;

derive the IDNNS from the IMSI, if a valid TMSI is not available.

Upon receiving the RRC Initial Direct Transfer message, the RNC 411 may, in step 7, check the IDNNS field in the message. If the IDNNS-identified CN node, i.e. the MSC, is in a normal state then the CN node may be selected according to the TS 23.236 standard. However, if the IDNNS-identified CN node failed then the NAS PDU may be decoded. However, if the NAS PDU is a paging response then a new IDNNS from the IMSI IE may be derived and the CN node may be selected according to the temporarily stored global CN ID and e.g. the IDNNS mapping. If the NAS PDU is not a paging response but e.g. a location update, a CM service request, or a detach, then the CN node may be selected according to the load sharing mechanism which may be based on the TS 23.236 standard.

In step 8, the RNC 411 may encapsulate the NAS PDU forming an embodiment of the paging response in the RANAP Initial UE Message, and send it to the selected CN node, i.e. to the MSC that initiated the paging request.

Figure 7:
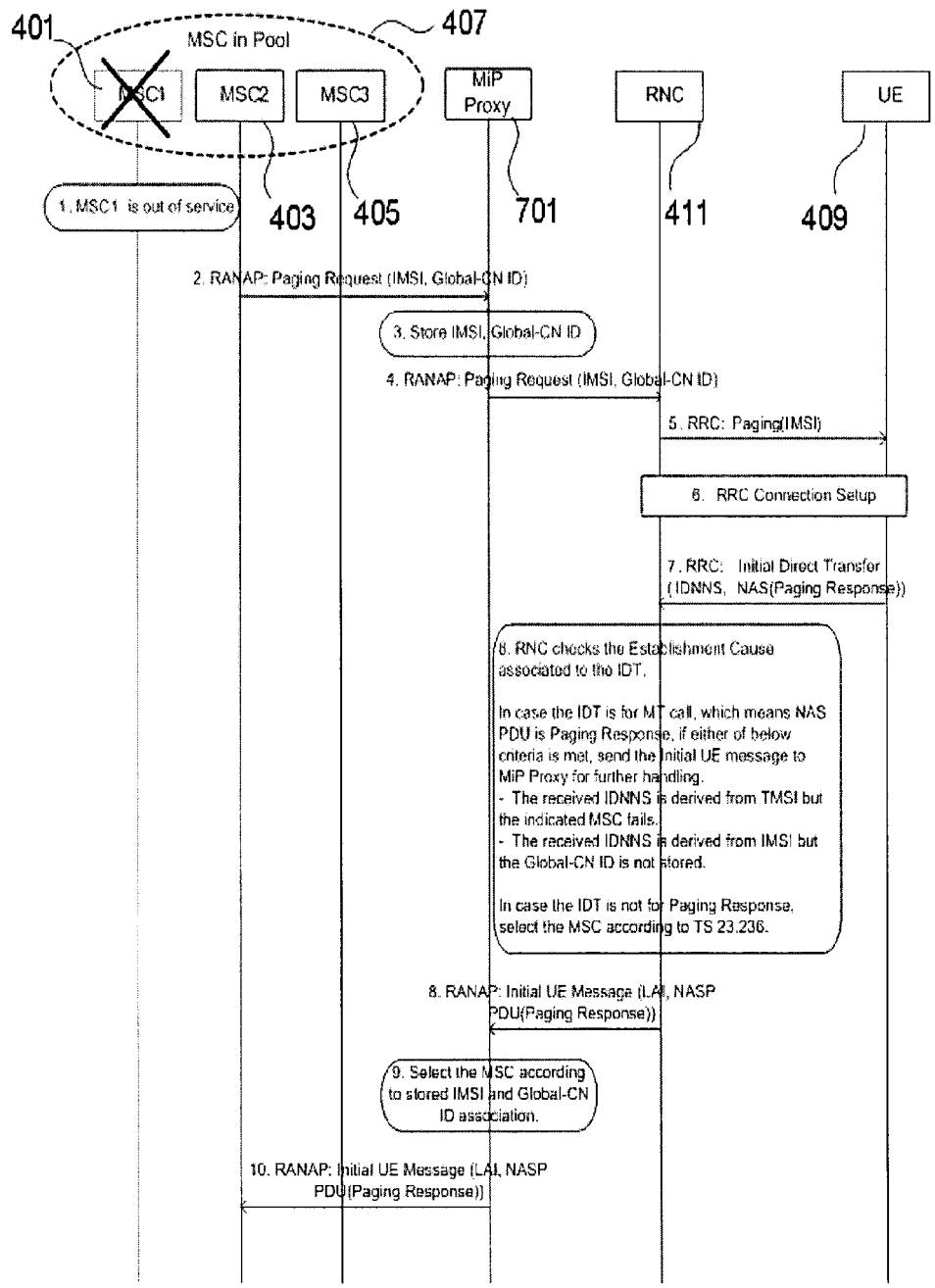
FIG. 7 shows a sequence diagram depicting exemplary messages in a mobile call termination.

FIG. 7 shows a mobile terminated call scenario, wherein a network proxy entity 701, e.g. a MiP proxy, is provided for managing communications of the MSC pool 407. In particular, the MiP proxy is a solution making it possible to connect the MSC Pool to the BSC/RNCs that do not support the MSC pool function. Thus, as depicted in FIG. 7, the IMSI paging approach with RNC/MiP Proxy based on ENNSF may be realized similar to the embodiment shown in FIG. 6.

With reference to FIG. 7, the stand-by MSC, e.g. the second MSC 403, may send the paging request to the network proxy entity 701 (MiP Proxy) in case of IMSI-based paging. The network proxy entity 701 may, when receiving the IMSI-based paging request from the second MSC 403, store the global CN ID and the IDDNS derived from IMSI in the paging request. Then, the network proxy entity 701 may forward the paging request to the RNC 411. Correspondingly, the RNC 411 may, upon receiving the Initial Direct Transfer message and if the initial NAS message represents a paging response and, optionally, if one of the criteria mentioned in the following is met:

the received IDNNS is derived from the TMSI but the MSC indicated therein is out of service fails; and/or the received IDNNS is derived from the IMSI but the global CN ID is not stored, forward the message to the network proxy entity 701 for further handling.

Upon receiving the Initial UE message and if the initial NAS message represents a paging response then the IMSI IE shall be retrieved. Furthermore, the network proxy entity 701 shall select the MSC according to the temporarily stored global CN ID and the IMSI/IDNNS mapping.

Preferably, the network proxy entity 701 may be introduced and/or configured in the MSC pool 407 such that e.g. each MSC and/or RNC may configure the signaling routes towards the network proxy entity 701. Besides supporting non-pool aware LA, the network proxy entity 701 may be configured to support pool aware LA as well.

The call flow for e.g. the IMSI paging approach with RNC/MiP proxy based ENNSF may be executed as follows:

During the pre-call flow phase and/or during the O&M configuration, the network proxy entity 701 may be introduced and/or configured in the MSC pool 407, wherein pool aware LA may be configured in the network proxy entity 701 as well. If one MSC/VLR, e.g. the first MSC 401, is out of service in the MSC pool 407, step 1, then, in step 2, the stand-by MSC/VLR, e.g. the second MSC 403, may initiate the IMSI-based paging when mobile terminated call is indicated towards the mobile station 409 which may be registered in the failed MSC/VLR 401. According to the IMSI-based paging approach, the second MSC/VLR 403 forwards this message to the network proxy entity 701. If the RANAP paging message is received without TMSI then the network proxy entity 701 may, in step 3, store the IDDNS derived from the IMSI together with the global CN ID identifying the corresponding MSC temporarily. Thereafter, the network proxy entity 701 may, in step 4, forward the RANAP paging message to the RNC 411 which, in response thereto, may initiate the paging request with the IMSI identifying the mobile station 409. In step 5, the RNC 411 may indicate the paging with the IMSI of the mobile station 409. In step 6, the mobile station 409 may observe the paging and set up a RRC connection with the RNC 411. In step 7, the mobile station 409 may send the Initial Direct Transfer message towards the RNC 411, wherein the mobile station may set the IE "Intra Domain NAS Node Selector" (IDNNS) as follows:

derive the IDNNS from the TMSI whenever a valid TMSI is available; and/or base the IDNNS on the IMSI when a valid TMSI is not available.

According to some implementations, the IDNNS may be derived from TMSI whenever a valid TMSI is available. If a valid TMSI is not available then the IDNNS may be derived from the IMSI.

Upon receiving the RRC Initial Direct Transfer message, the RNC 411 may, in step 8, check the "Establishment Cause" received either in the RRC Initial Direct Transfer message or in the RRC connection request message associated to the Initial Direct Transfer message. If the received message is not a paging response then the RNC 411 may select the MSC/VLR e.g. according to the TS 23.236 standard. Otherwise, the RNC 411 may continue to check the IDNNS field.

If the IDNNS is derived from the TMSI and if the identified CN node, i.e. the first MSC 401, is in a normal state, then the RNC 411 may select the MSC according to the TS 23.236 standard. Otherwise, the RNC 411 may encapsulate NAS PDU representing the paging response in the RANAP Initial UE Message and send the resulting message to the network proxy entity 701 for further handling.

If the IDNNS is derived from the IMSI and if the global CN ID is stored already, then the RNC 411 may select the MSC according to the TS 23.236 standard. Otherwise, the RNC 411 may encapsulate the NAS PDU, i.e. the paging response, in the RANAP Initial UE Message and send the resulting message to the network proxy entity 701 for further handling.

Upon receiving the RANAP Initial UE Message, the network proxy entity 701 may, in step 9, decode the NAS PDU, i.e. the paging response, retrieve the IMSI IE, derive the IDNNS value and select the MSC according to the stored IDNNS and the global CN ID as described above. In step 10, the network proxy entity 701 may forward the RANAP Initial UE Message and send it to the selected MSC, i.e. the MSC that initiated the paging request.

Figure 8:
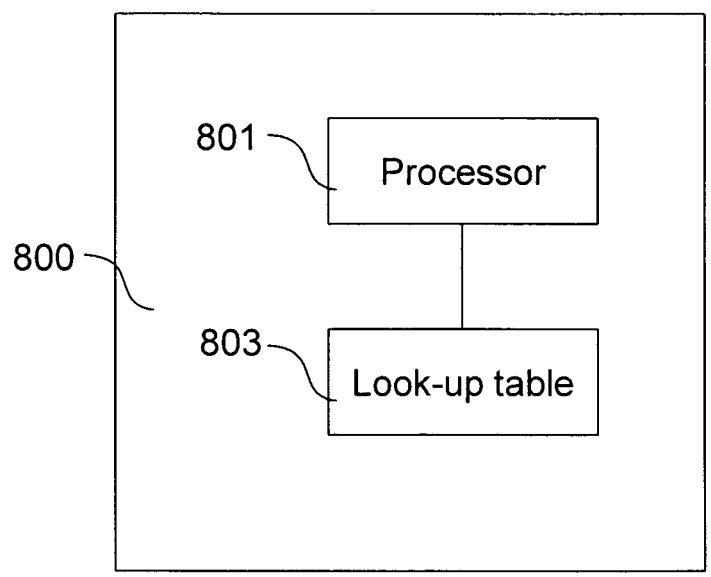
FIG. 8 shows a block diagram of an embodiment of a network entity.

FIG. 8 shows a network entity 800, e.g. a RNC, for handling communications towards a pool of mobile switching centers. The network entity comprises a processor 801 for assigning a first mobile switching center and a second mobile switching center to the same network resource identification value in order to configure the second mobile switching center to form a stand-by for the first mobile switching center. The network entity may further comprise a look-up table 803 for storing the assignment. The look-up table 803 may be implemented in a memory, e.g. in an addressable memory.

Figure 9:
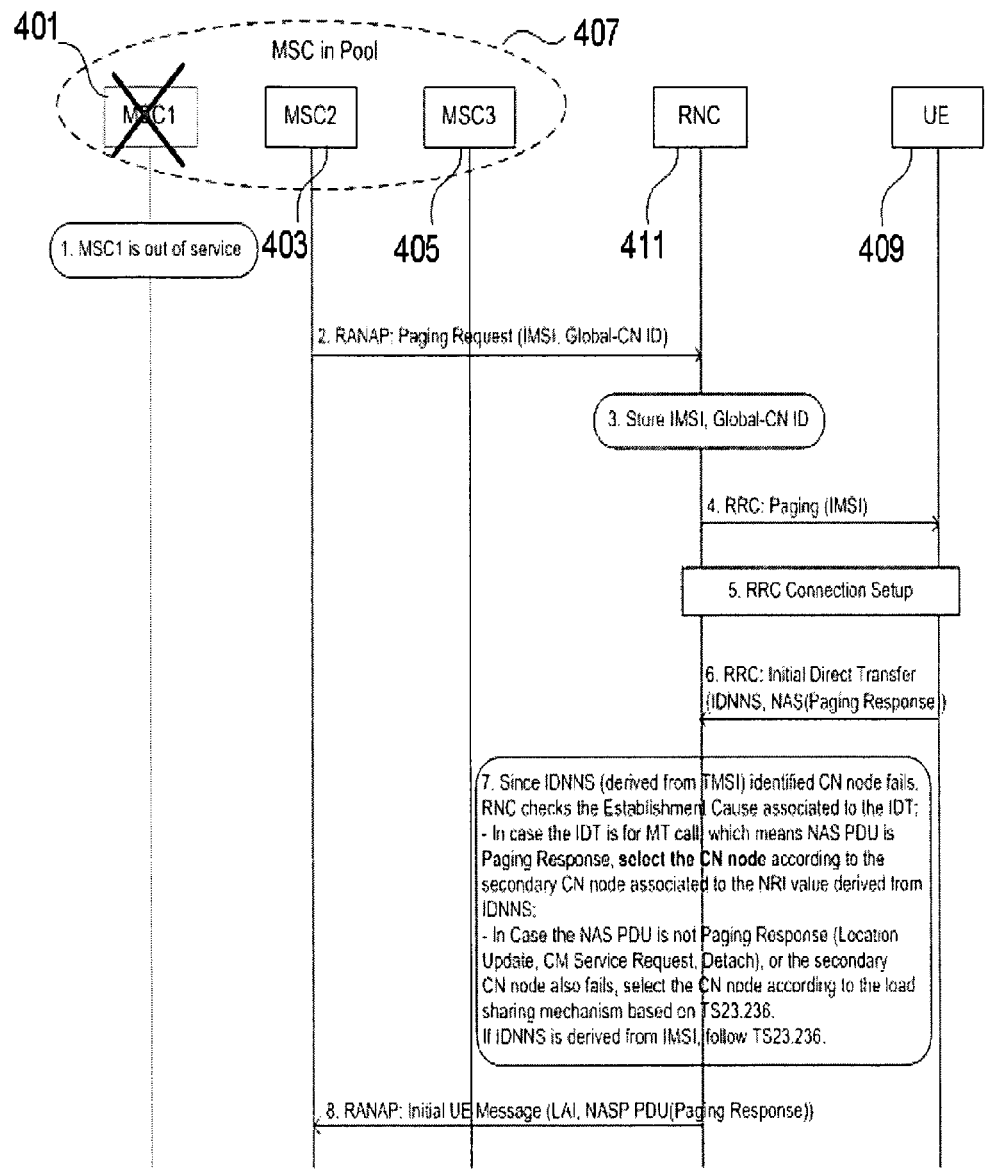
FIG. 9 shows a sequence diagram depicting exemplary messages a mobile call termination.

FIG. 9 shows a mobile call termination according to which a stand-by MSC may be configured by either the RNC 411 or the network proxy entity e.g. upon the basis of the network identifier (NRI) values identifying the MSCs in the MSC pool 407. The RNC 411 may have the structure and/or features of the network entity depicted in FIG. 8.

By way of example, the RNC 411 may store the global CN ID and the IDDNS derived from the IMSI comprised by the paging request when receiving the IMSI-based paging from e.g. the second MSC 403 forming the stand-by for the first MSC which may be out of service. Furthermore, for a NRI value or for each NRI value, e.g. two Circuit Switched CN nodes, e.g. the NRI associated MSC may be configured according to the TS23.236 standard. In addition, also the corresponding stand-by MSC may by associated with the NRI. Thus, the NRI may simultaneously point towards a MSC and to the MSC's stand-by MSC.

If the IDNNS derived from the TMSI and if the CN node, i.e. the MSC, associated to the NRI value derived from the IDNNS is out of service, and if the initial NAS message is paging response, then the secondary associated CN node, i.e. the stand-by MSC, may be selected. Thus, the message, e.g. the paging response, may be routed to the stand-by MSC if the MSC associated with the NRI is not available.

According to some implementations, the RNC 411 may store the global CN ID and the IDDNS derived from the IMSI in the paging request when receiving the IMSI-based paging from e.g. the second MSC 403. Then, if the received IDNNS is derived from IMSI in the initial direct transfer message, the RNC 411 may retrieve the temporary stored global CN ID to select the correct MSC.

According to some implementations, the RNC 411 may configure, for each NRI value, two Circuit Switched CN nodes, i.e. the NRI associated MSC and its corresponding stand-by MSC.

According to the TS 23.236 standard, an association between NRI values and CN node addresses may be configured in the RNC 411. In addition, also a secondary CN node, i.e. MSC, may be associated to a NRI value, to some NRI Values or even to each NRI value. Thus, not only the (primary) MSC which is anyway associated with the NRI but, in addition, also a secondary MSC forming a stand-by MSC for the primary MSC is associated to the same NRI. The association may be stored e.g. in a look-up table having the following entries:

| NRI value | Associated CN node (CS) = NRI associated MSC | Secondary associated CN node (CS) = stand-by MSC |
|---|---|---|
| . . . | . . . | . . . |
| 5 | MSC 401 | MSC 403 |
| . . . | . . . | . . . |

With reference to FIG. 9, if the IDNNS is derived from TMSI and if the CN node associated with the NRI value derived from the IDNNS fails, and if the initial NAS message included in the IDT message is a paging response, then the RNC 411 may select the secondary associated CN node, i.e. the second MSC 403, associated to the NRI value so that the message is routed to the stand-by MSC in case of NRI associated MSC failure.

The call flow for the IMSI paging with the RNC-based ENNSF may be executed as follows:

In the pre-call flow phase, e.g. during a O&M configuration—for each NRI value, two Circuit Switched CN nodes may be associated to each other, i.e. the NRI associated MSC and its corresponding stand-by MSC. If e.g. the first MSC 401 is out of service in the MSC pool 407, step 1, then the stand-by MSC/VLR 403 may, in step 2, initiate IMSI-based paging when mobile terminated call is indicated towards the mobile station 409 which may be registered in the failed MSC/VLR 401. If the RANAP paging message is received without TMSI then the RNC 411 may, in step 3, store the IDDNS derived from the IMSI and the global CN ID together temporarily. In step 4, the RNC 411 may initiate paging with the IMSI of the mobile station 409. In step 5, the mobile station 409 may observe the paging and set up a RRC connection with the RNC 411.

In step 6, the mobile station may send the Initial Direct Transfer message towards the RNC 411, wherein the mobile station 409 may set the IE "Intra Domain NAS Node Selector" (IDNNS) as follows:

derive the IDNNS from the TMSI whenever a valid TMSI is available; and/or base the IDNNS on the IMSI when a valid TMSI is not available.

Upon receiving the RRC Initial Direct Transfer message, the RNC 411 may, in step 7, check the IDNNS field. If the IDNNS-identified CN node, e.g. the first MSC 401, is in a normal state then the CN node, i.e. MSC, may be selected according to the TS 23.236 standard. However, if the IDNNS identified CN node, i.e. MSC, failed, and if the IDNNS is derived from the TMSI, then the RNC 411 may check the "Establishment Cause" received either in the RRC Initial Direct Transfer message or in the RRC connection request message associated to the Initial Direct Transfer message.

If the "Establishment cause" is used for a mobile terminated call, which implies the initial NAS message is paging response, then the secondary CN node associated to the NRI value, e.g. the second MSC 403, may be selected e.g. during the O&M configuration.

However, if the IDNNS is derived from the IMSI, or if the "Establishment cause" is not used for a mobile terminated call, so that the initial NAS message is a location update, a CM service request, or a detach, or if the secondary CN node also failed, then the CN node may be selected according to the TS 23.236 standard so that the NAS Node Selection Function in the RAN node may balance the load between the available CN nodes, i.e. MSCs.

In step 8, the RNC 411 may encapsulate the NAS PDU, i.e. the paging response in the RANAP Initial UE Message and send the resulting message to the selected CN node, e.g. to the second MSC 403, which initiated the paging request.

With reference to the above embodiments, if the global identity information, e.g. global CN ID, may identify the paging initiating MSC, i.e. the second MSC, wherein the first MSC which is out of service may not be assigned any global identity information, e.g. global CN ID, at all. In order to assign the mobile identity information to the respective MSC, the first and the second MSC 401, 403 may manually be configured per NRI value in a memory/look-up table. Thus, when e.g. the RNC 411 or the network proxy entity 701, e.g. the MiP proxy, receives the RRC Initial Direct Transfer message, they will check the IDNNS parameter. However, if it is derived from the TMSI, i.e. if it is a NRI value, and if the indicated MSC is out of service, then the RNC 411 or the MiP proxy 701 may check the look-up table/memory to obtain the correct second, i.e. stand-by, MSC 403 based on received NRI value. Then the RNC 411 or the MiP proxy 701 may forward the RANAP Initial UE message encapsulating Paging Response to the appropriate MSC, i.e. to the second MSC 403. If the received IDNNS parameter is derived from the IMSI, then the RNC 411 or the MiP proxy 711 may forward the RANAP Initial UE message to the MSC indentified by global CN ID, which may temporarily be stored when receiving the paging request. If the IDNNS parameter is derived from IMSI then, according to some implementations, the look-up table may not be employed.

According to some implementations, the global CN ID may be included in the paging request message and stored temporarily in the RNC 411 or in the network proxy entity 701, e.g. MiP proxy, shown in FIG. 1. However, the global CN ID may only be used when the received IDNNS parameter is derived from the IMSI. In this case, the RNC 401 or the MiP proxy 701 may use the stored global CN ID to forward the RANAP Initial UE message. If the received IDNNS parameter is derived from the TMSI and if the IDNNS parameter indicated MSC fails then the RNC 411 or the MiP proxy 701 may refer to the look-up table to obtain the corresponding second MSC 403 to forward the RANAP Initial UE message. In this case, the global CN ID may not be used.

With reference to the above embodiments, the term "global identity information" may denote a global CN ID which is included in a RANAP Paging Request message and may be used to identify the paging initiating MSC in particular in the IMSI paging scenario. Furthermore, the term "global identity information" may denote an IDNNS, which is included in the RRC Initial Direct Transfer message and may also used to identify to which MSC to re-transmit the paging response. In addition, the term "identity information" may denote the IMSI which is included in the NAS PDU Paging Response and may be used to identify the mobile station. In particular, the NAS PDU Paging Response may be encapsulated in the RRC Initial Direct Transfer message.

The particular combinations of elements and features in the above detailed embodiments are exemplary only; the interchanging and substitution of these embodiments with other embodiments disclosed herein are also expressly contemplated. As those skilled in the art will recognize, variations, modifications, and other implementations of what is described herein can occur to those of ordinary skill in the art without departing from the spirit and the scope of the invention as claimed. Accordingly, the foregoing description is by way of example only and is not intended as limiting. The invention's scope is defined in the following claims and the equivalents thereto. Furthermore, reference signs used in the description and claims do not limit the scope of the invention as claimed.

The invention claimed is:

1. A network entity for handling communications towards a mobile station over a communication network, the mobile station capable of receiving a paging request from a mobile switching center of a pool of mobile switching centers, and, in response to the paging request, of transmitting a paging response over the communication network, the network entity comprising:
    a receiver configured to receive the paging response, the paging response comprising mobile identity information identifying the mobile station;
    a processor configured to identify the mobile switching center to which to re-transmit the paging response based on the mobile identity information; and
    a transmitter configured to re-transmit the paging response to the identified mobile switching center,
    wherein the processor is further configured to:
        assign a first mobile switching center to a network resource identification value; and
        assign a second mobile switching center to the network resource identification value to configure the second mobile switching center to form a stand-by for the first mobile switching center.

2. The network entity of claim 1, the network entity comprising a network proxy entity for managing communications of the pool of mobile switching centers with a radio network controller or a base station controller, wherein:
    the receiver is further configured to receive the paging request from the mobile switching center; and
    the transmitter is further configured to re-transmit the paging request to the radio network controller or to the base station controller.

3. The network entity of claim 1, the network entity comprising a radio network controller for communicating with the mobile station, wherein:
    the receiver is further configured to receive the paging request from the mobile switching center; and
    the transmitter is further configured to forward the paging request to the mobile station.

4. The network entity of claim 1, wherein the processor is configured to identify the mobile switching center to which to re-transmit the paging response based on the mobile identity information, pre-stored mobile identity information, and a global identity information identifying the mobile switching center which initiated the paging request.

5. The network entity of claim 1:
wherein the receiver is further configured to receive the paging request, the paging request comprising mobile identity information identifying the mobile station and a global identity information identifying the mobile switching center which initiated the paging request; and
wherein the network entity further comprises a memory for storing the mobile identity information and the global identity information received with the paging request.

6. The network entity of claim 1, wherein the processor is further configured to map the mobile identity information received with the paging response onto pre-stored mobile identity information to determine global identity information for identifying the mobile switching center.

7. The network entity of claim 1, wherein the processor is further configured to identify the mobile switching center based on a look-up table comprising the network resource identification value indicating both the first mobile switching center and the second mobile switching center configured to replace the first mobile switching center if the first mobile switching center is out of service.

8. The network entity of claim 1, wherein the processor is further configured to:
derive global identity information from the mobile identity information, the global identity information indicating the mobile switching center which initiated the paging request, the mobile switching center that initiated the paging request having an assigned second network resource identification value; and
assign a further mobile switching center with the second network resource identification value.

9. The network entity of claim 1, wherein the mobile identity information comprises an International Mobile Subscriber Identity or a Temporary Mobile Subscriber Identity.

10. The network entity of claim 1, wherein the processor is further configured to identify a mobile switching center to which to re-transmit the paging response if a mobile switching center in which the mobile station is registered is out of service.

11. The network entity of claim 1, wherein the processor is further configured to derive an Intra-Domain None Access Stratum Node Selector (IDNNS) parameter from the paging response to determine whether the IDNNS parameter indicates that the mobile station is registered in a mobile switching center which is out of service.

12. The network entity of claim 1, wherein the network entity is configured to support communications according to at least one of:
Universal Mobile Telecommunication System (UMTS);
Global System for Mobile Communications (GSM);
Long Term Evolution (LTE); or
Code Division Multiple Access 2000 (CDMA2000).

13. A method, implemented by a network entity, for handling communications towards a mobile station over a communication network, the mobile station capable of receiving a paging request from a mobile switching center of a pool of mobile switching centers, and, in response to the paging request, of transmitting a paging response over the communication network, the method comprising:
receiving the paging response at a receiver in the network entity, the paging response comprising mobile identity information identifying the mobile station;
identifying, by the network entity, the mobile switching center to which to re-transmit the paging response based on the mobile identity information;
re-transmitting the paging response by a transmitter in the network entity to the identified mobile switching center; and
assigning, by the network entity, a first mobile switching center to a network resource identification value and assigning a second mobile switching center to the network resource identification value to configure the second mobile switching center to form a stand-by for the first mobile switching center.

14. A network entity for handling communications towards a pool of mobile switching centers, the network entity comprising a processor configured to assign a first mobile switching center to a network resource identification value and to assign a second mobile switching center to the network resource identification value to configure the second mobile switching center to form a stand-by for the first mobile switching center.

15. A method, implemented by a network entity, for handling communications towards a pool of mobile switching centers, the method comprising:
assigning, by the network entity, a first mobile switching center to a network resource identification value; and
assigning, by the network entity, a second mobile switching center to the network resource identification value to configure the second mobile switching center to form a stand-by for the first mobile switching center.

16. A computer program product stored in a non-transient computer readable medium for controlling a programmable network entity, the computer program product comprising software instructions which, when run on the network entity, causes the network entity to:
assign a first mobile switching center to a network resource identification value; and
assign a second mobile switching center to the network resource identification value to configure the second mobile switching center to form a stand-by for the first mobile switching center.

* * * * *